UNITED STATES PATENT OFFICE.

EDWIN L. SIMPSON, OF BRIDGEPORT, CONNECTICUT.

IMPROVEMENT IN THE MANUFACTURE OF INDIA-RUBBER, GUTTA-PERCHA, &c.

Specification forming part of Letters Patent No. 58,902, dated October 16, 1866.

*To all whom it may concern:*

Be it known that I, EDWIN L. SIMPSON, of Bridgeport, in the county of Fairfield and State of Connecticut, have invented a new Process of Manufacturing India-Rubber, Gutta-Percha, &c.; and do hereby declare the following to be a full, clear, and exact description of the same.

The object of my invention is to produce a vulcanized india-rubber or gutta-percha compound free from the odor or effects of free sulphur common in vulcanized goods, and consists of the combination of linseed or other vegetable oil, sulphur, and benzoin gum.

To enable others skilled in the art to prepare and use my compound, I will proceed to describe my manner of so doing.

I first boil the oil to the consistency of honey. (This I do to facilitate the preparation.) The sulphur I pulverize to a powder, and thoroughly mix therewith the benzoin gum, in the proportion of two ounces of the gum to one pound of the sulphur. Then to each quart of the boiled oil add one pound of the prepared sulphur. More of the sulphur causes the compound to act quicker, and less of the compound to act more slowly. The proportion specified I find by experiment. Carefully subject this mixture to a moderate heat, sufficient only to cause the two substances to react upon each other until they pass from a semi-fluid to a semi-hard state, having a honey-comb or spongy appearance. This forms my vulcanizing compound, and differs from that patented to me February 28, 1865, in that the benzoin gum is added, which, by its vaporizing qualities, more perfectly expels the fumes of the sulphur as well as the odor from the oil, and renders the compound nearly if not perfectly odorless, and, when combined with india-rubber and subjected to a regulated heat, will cause the same to undergo the change known as "vulcanizing."

By this process of preparation and combination all the fumes of the sulphur, as well as the effects of the sulphur upon other articles than the rubber or kindred gums vulcanized in the usual manner, are entirely destroyed.

In the preparation of india-rubber or other allied gums preparatory to being subjected to the requisite heat, I find, by experiment, the following to be the proper proportion: If for dry heat, one pound of india-rubber or gutta-percha, two ounces of my vulcanizing compound above described, and eight ounces of litharge, and the proper coloring material; and, to increase the quantity at the expense of the quality, whiting may be added to the extent of about eight ounces. Mix all together in the usual manner by grinding between heated rolls.

If not for dry heat, the litharge may be left out.

When properly prepared the preparation may be applied to fabrics in the usual manner of applying similar compounds; or it may be used independent of fabrics and rolled into thin sheets, or fashioned in similar manner as common india-rubber or gutta-percha, and cured by subjecting to the requisite heat in the proportion which the quantity of vulcanizing compound bears to the quantity of india-rubber to be vulcanized, in like manner as for the common sulphur vulcanization; and the material or article produced by my vulcanization is entirely and positively free from all odor or effect of free sulphur or oil, the benzoin gum, by its well-known vaporizing qualities, entirely expelling all appearance of either.

Having therefore thus fully described my invention, what I claim as new and useful, and desire to secure by Letters Patent, is—

1. The herein-described compound of vegetable oil, sulphur, and benzoin gum, prepared substantially as and for the purpose specified.

2. Combining the herein-described compound with india-rubber, gutta-percha, or other similar gum or gums, substantially as and for the purpose specified.

EDWIN L. SIMPSON.

Witnesses:
   E. A. PANETT,
   E. BIRDSEY.